United States Patent Office 3,558,171
Patented Jan. 26, 1971

3,558,171
PNEUMATIC ARRANGEMENT FOR TRANSFERRING ARTICLES
Alfred Netsch, Erwin Weber, and Wolfgang Ullrich, Selb, Germany, assignors to Gebruder Netzsch Maschinenfabrik, Selb, Germany
Filed Nov. 15, 1968, Ser. No. 776,231
Claims priority, application Germany, Nov. 15, 1967, 1,683,923
Int. Cl. B66c 1/02
U.S. Cl. 294—64                                    15 Claims

ABSTRACT OF THE DISCLOSURE

A pneumatic arrangement by which an article is raised through the application of a suction force. The raising suction force is generated through the contraction of a bellows which expels the air from its interior, and the subsequent expansion of the bellows so as to create a partial vacuum within the interior. The bellows is brought into contact with the article to be raised prior to the contraction and expansion process. A spring adjustment device permits adjustment in the suction force so that the vacuum within the bellows becomes neutralized when an article heavier than a predetermined weight adheres to the bellows. The vacuum within the bellows is also gradually neutralized when the article is to be redeposited after being raised so that the depositing procedure is accomplished in a gradual manner for the purpose of protecting fragile articles.

BACKGROUND OF THE INVENTION

In the manufacture of dishes or serving plates of ceramics substance, it is necessary to raise the plate from its plaster mold and transfer it to another location. The plates are picked up or raised from their molds by means of a suction head, and deposited at a desired station for further processing in manufacture. During this stage in the manufacture of food-serving plates, for example, the plates are very fragile and care must be exercised in handling the plates to avoid excessive breakage or partial fractures.

In practice it has been found that when the plates have not yet been released from the plaster mold upon which they are formed, in the preliminary drying stage, the plate together with the plaster mold tends to become engaged and transferred in combination by the suction head. At the same time, if a mold does not have a plate molded onto it in the first place, the mold tends to adhere to the suction head and to become transferred by it to the depositing or receiving station. This undesired condition in which a mold arrives at the receiving or depositing station, upsets the manufacturing process, and incurs breakage of the plate and/or the molds.

Accordingly, it is an object of the present invention to provide a suction head to which only a plate will adhere during the transfer process in which the suction head transfers a plate from its mold to a receiving station. It is the specific object of the present invention to reject any transfer process in which the mold adheres to the plate, or the mold is transferred without a plate.

The objects of the present invention are achieved through a bellows which forms an integral unit with a profile element and a cap nut. This integral unit is displaceable downward on the lower end of a tubular member, and sits with the cap nut on a compression spring. The support or compression spring is secured to the profile member, and the cap nut is designed to adjust the spring pressure. As a result of this adjustment of the spring pressure, the suction force applied by the bellows may be adjusted. When the suction force, determined by a presetting of the spring pressure, is exceeded through, for example, the adherence of a mold to the plate being raised, the profile member becomes displaced in the downward direction. This action of the profile member permits outside air to enter through perforations in the support for the compression spring and in the profile member. This outside air then passes through a gap formed above a sealing ring at the lower end of the tubular member, and thereby breaks the vacuum and eliminates the suction force of the bellows.

With the preceding design of the suction head, articles heavier than the plate to be transferred, cannot be raised from their positions, and as a result the possibility of transferring the plate molds is eliminated. This design, in accordance with the present invention, therefore contributes considerably toward smooth manufacturing operation with increased reliability.

SUMMARY OF THE INVENTION

A pneumatic arrangement for transferring dishes or serving plates, of ceramic type, during manufacture. The plate molded upon a mold, is raised by a suction head and deposited at a receiving station for further processing. Suction is established through a bellows which is first contracted to expel air therefrom, and is then expanded for the purpose of establishing a partial vacuum within the bellows. The latter has a contact ring which contacts the plate or dish to be raised. A spring and cap nut combination is provided by which the suction force may be adjusted to a predetermined quantity. When a plate tends to stick to its mold, the preset suction force is exceeded and outside air is permitted to enter through openings and into the bellows chamber for the purpose of neutralizing the partial vacuum that was established. As a result, no plate can be raised if it will adhere to its mold, nor will any mold be raised by the suction head, if the plate is upon the mold. An additional arrangement is provided by which the plates are deposited gently at the receiving station. The compressed air is released from the suction head in a gradual manner, and thereby the plates are lowered gradually to their receiving locations.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawing.

DESCRIPTION OF THE PREFERRED EMBODIMENTS

Figure 1:
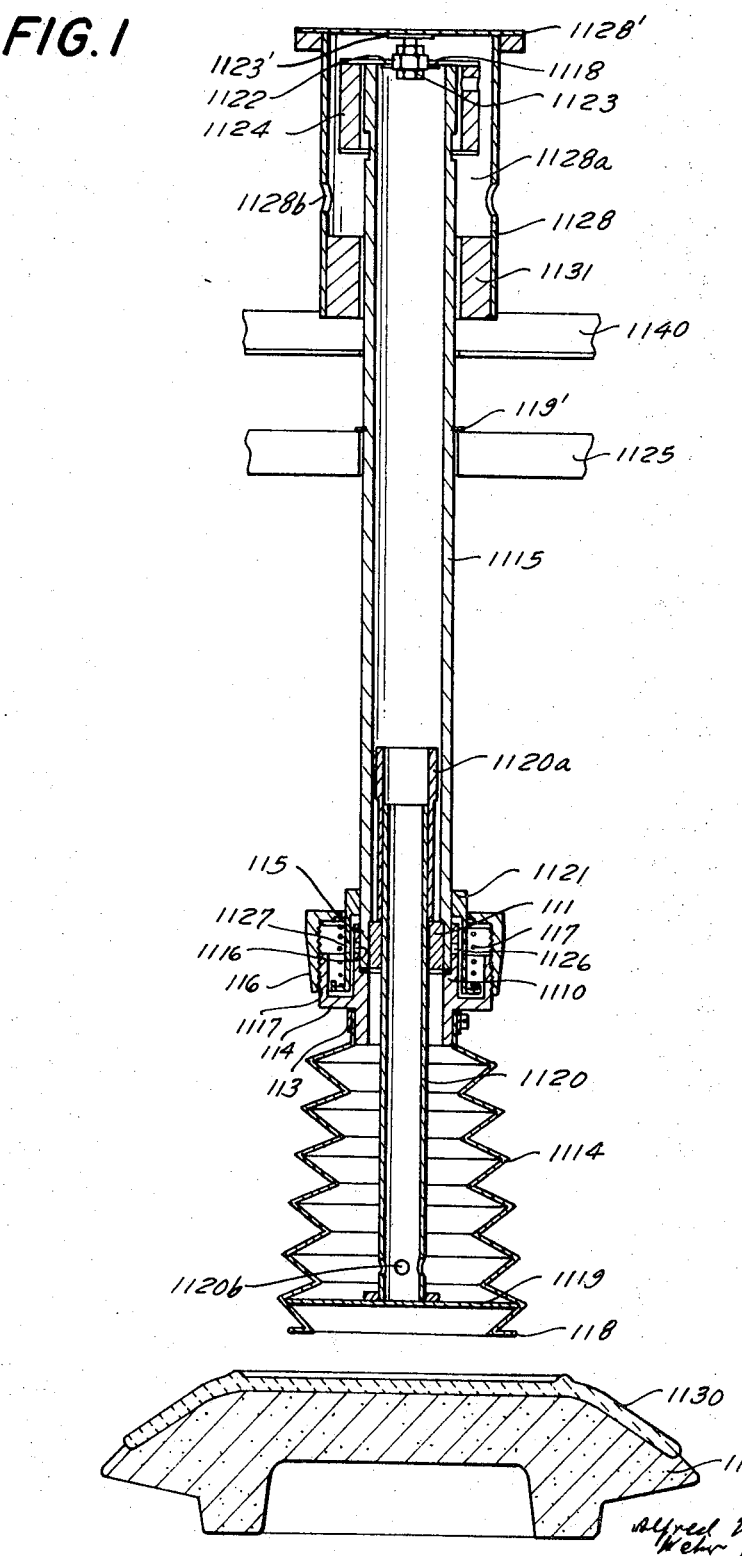
FIG. 1 is a sectional view through the longitudinal axis of the suction head when in the raised position prior to engaging a plate for transferring to a receiving station, in accordance with the present invention.

Referring to the drawing, the suction head is guided to be vertically movable through a tubular member 1115 within a supporting member 1125. The tubular member 1115 are mounted in place through the rings 119'. At the lower end of the tubular member 1115, a sleeve 111 is inserted for the purpose of guiding a tube 1120. A disk 1119 is secured to the lower end of the tube 1120 and engages the lowest fold of a bellows 1114. This arrangement of the disk 1119 in relation to the bellows 1114 prevents lateral deformation of the bellows. The tube 1120 is also guided at its upper end through a second guiding surface 1120*a*.

The bellows 1114 is secured at its upper end to a profile member 114 through a clamping ring 113. The profile member 114 is displacable on the tubular element 1115, with its bore 115. A sealing ring 1110 serves to seal the junction between the profile member 114 and the tubular member 1115. The profile member 114 has an inner sleeve 116 and an outer sleeve 1117. Between these two sleeves of the member 114, a support 1121 is arranged for the purpose of supporting a compression spring 117. The support 1121 is fastened at its upper portion to the tubular member 1115 through threaded screw means.

For the purpose of supporting the profile member 114 with the bellows 1114 joined to it, a cap nut 116 is threadably secured or screwed to the externally screw-threaded portion of the member 114. The cap nut 116 is engaged by the compression spring 117, and the arrangement is such that the cap nut 116 can be adjusted to adjust the pressure or force exerted by the compression spring 117.

Figure 2:
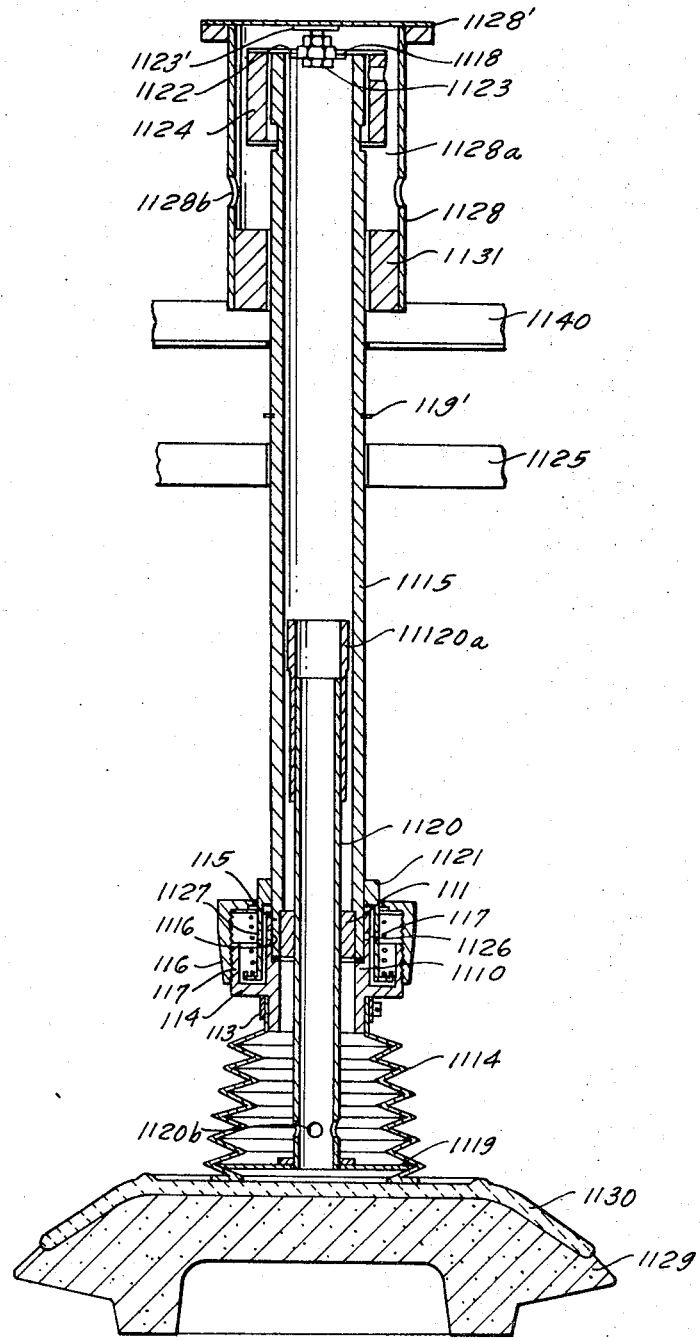
FIG. 2 is a sectional view of the suction head of FIG. 1 when in the lowered position and engaging the plate to be raised.

To carry out a suction operation, the suction head is lowered by the supporting member 1125. This lowering procedure is carried out until the lower end of the bellows 1114, shaped in the form of a suction ring 118, contacts the plate 1130 which is to become attached to the suction head assembly, as a result of applied suction pressure. After contact has thus been established between the ring 118 and the plate 1130, the suction head is lowered somewhat further for the purpose of contracting the bellows 1114 and thereby producing compressed air within the tubular member 1115. Thus, the air compressed as a result of contraction of the bellows is forced through the openings 1120*b* into the tube 1120. The compressed air then enters the member 1115 from the tube 1120, and acts upon an elastic disk 1118 provided on the upper end of the tubular member 1115. The compressed air lifts this elastic disk 1118 and escapes through the gap resulting from the lifting action, into the free atmosphere. The elastic disk 1118 is secured through an iron strip 1122 associated with an air admission screw 1123. A ring 1124 supports this assembly so that the two halves of the disk can be lifted. FIG. 2 shows the iron or metal strip 1122 when offset through an angle of 90°. Air passing out of the interior of the member 1115, through the disk 1118, is transferred to the chamber 1128*a* and exits into the atmosphere through the opening 1128*b*.

When the tubular member 1115 becomes lifted or raised, the bellows 1114 becomes expanded and as a result a partial vacuum is created within the interior of the member 1115. This partial vacuum has the effect of closing the gap between the elastic disk 1118 and the member 1115. As a result of this partial vacuum existing also within the interior of the bellows 1114, suction is applied to the plate 1130, over the interior area of the suction ring 118. As the member 1115 continues to be raised, the plate 1130 adheres to the suction ring 118, and remains attached to this suction ring until it is released by destroying the vacuum within the bellows. The vacuum becomes eliminated when the plate 1130 has first been deposited in the desired position or place, through appropriate motion of the member 1115.

To assure that no plaster molds 1129 are mistakenly raised as a result of the suction pressure, or to assure that the molds do not adhere to the plates 1130 when these are raised by the suction head, the applied suction force of the bellows 1114 is adjusted so that only a predetermined weight can be carried by the latter. This adjustment of the suction force is carried out by adjusting the preloading or setting of the compression spring 117, through a cap nut 116. Thus, the mold 1129 is considerably heavier than the plates 1130 which are to be raised, and as a result it is possible to regulate the suction force with sufficient precision to differentiate between the two weights of the plate and the mold, or the combination of the plate and the mold. This is the case particularly when the plates weigh approximately 450 grams to 600 grams for 24 centimeter plates. The plate mold 1129, on the other hand, weighs approximately 2 kilograms. When the mold 1129 is, therefore, engaged through the suction pressure, the excess weight serves to pull the profile member 114 downward together with the cap nut 116, after the extension of the bellows 1114. As a result of this downward motion, the sealing ring 1110 also moves downward, and this action causes the sealing ring to separate from the lower surface of the tubular member 1115. This separation between the sealing ring and the member 1115, produces a gap through which air may enter between the support 1121 and cap nut 116, and through the perforations 1126 and 1127 into the bellows 1114. As a result of the inrush of air from the outside, in this manner, the partial vacuum is nullified, and the suction effect upon the plaster mold 1129, is thereby eliminated. The plaster mold 1129, therefore, remains in its position, as desired.

After the plate 1130 is attached to the ring 118 as a result of the partial vacuum prevailing within the bellows 1114, the plate is lifted to a depositing station through the moving action of the supporting member 1125 in conjunction with the ring 119' which bears on this supporting member. This lifting or raising motion may be of any desired magnitude so that the plate is brought into a desired position where it is to be deposited.

Figure 3:
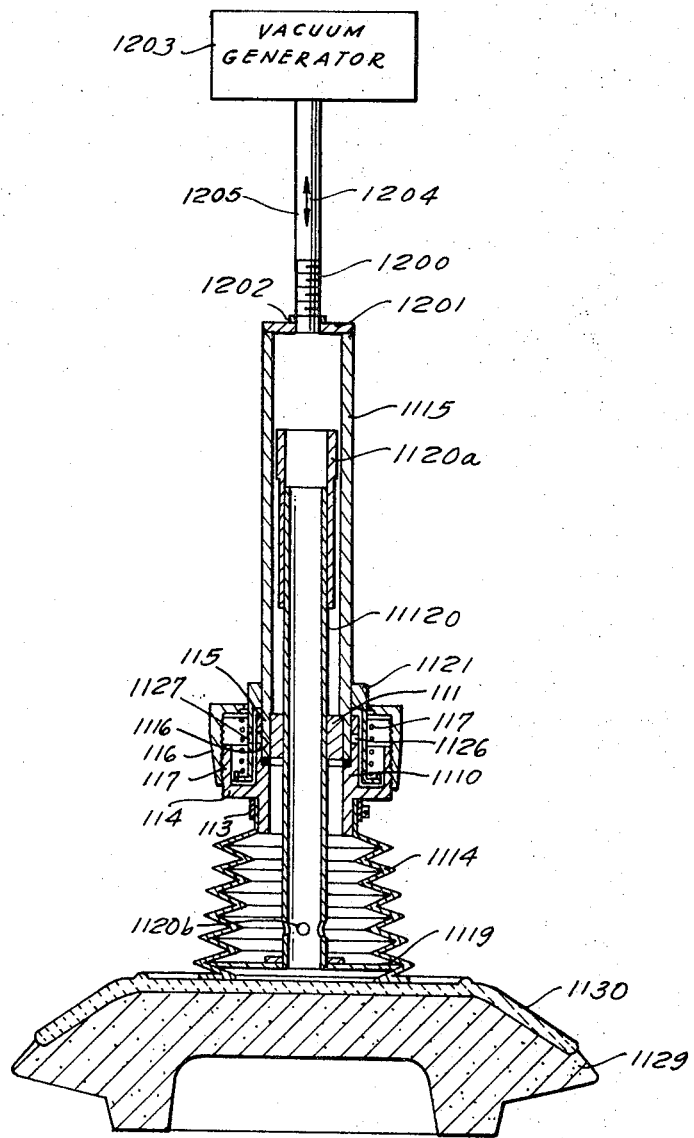
FIG. 3 is a sectional view of a further embodiment of FIG. 1.

When the plate thus arrives at the depositing station, the plate is held in position a few centimeters above the surface of the board or receptacle used for receiving it. To deposit the plate 1130 in a gentle manner so that no shock is applied to the plate, a cross-member 1140 raises a sleeve 1128 arranged displaceably on the upper portion of the tubular member 1115. The sleeve 1128 has a cover 1128' which bears on the air admission screw 1123. Through the sealing disk 1123' the performation in the admission screw is masked. As a result, the outside air enters the tubular member 1115 gradually, and the plate 1130 is thereby gradually lowered. To rapidly eliminate the residual vacuum in the bellows, the sleeve 1128 is then lifted by raising the cross-member 1140. As soon as the sleeve with the ring 1131 acts on the ring 1124, the latter is raised together with the elastic disk 1118 and away from the tubular member 1115. As a result, outside air can enter unobstructed into the tubular member and thereupon into the bellows. In a further embodiment shown in FIG. 3, the air is evacuated from the interior of the bellows through a vacuum pump communicating with the interior of the tubular member 1115 through the nipple 1200. In this embodiment, the top of the tubular member is sealed with a sealing disc 1201 having a central opening into which the nipple 1200 is inserted. A sealing washer 1202 assures a leakage proof seal between the nipple 1200 and the disc 1201. A hose 1205 may be used to to couple the vacuum generator 1203 to the nipple 1202.

In the operation, the air within the bellows is partially evacuated through the vacuum pump or egnerator 1203. Air flow between the interior of the tubular member 1115 and the vacuum generator or pump may take place in either direction as illustrated by the double arrow 1204. After a partial vacuum has thus been established within the bellows 1114, the plate is raised by the suction head as described above, since the plate will adhere to the contact rim 118 of the bellows. In the event that the mold adheres to the plate, or the mold alone is in contact with the bellows, then the cap nut 116 in conjunction with the compression spring 117 will act to neutralize the vacuum as described in relation to FIGS. 1 and 2. For the purpose of subsequently depositing the plate at a receiving station to which it has been raised, air may be gradually reintroduced to the interior of the bellows through the nipple 1200. In this embodiment of FIG. 3, the bellows 1114 continues to function with the spring 117 and cap nut 116 to eliminate the possibility of picking up any weight heavier than the plate. Thus, any excess weight will cause the bellows to expand additionally and thereby result in an increase in the vacuum or suction within the bellows. The preset spring pressure will then be unbalanced by the increased suction and air will be admitted to neutralize the vacuum in the bellows as described in relation to FIGS. 1 and 2.

It will be understood that each of the elements described above, or two or more together, may also find a useful application in other types of constructions differing from the types described above.

While the invention has been illustrated and described as embodied in pneumatic transfer devices, it is not intended to be limited to the details shown, since various modifications and structural changes may be made without departing in any way from the spirit of the present invention.

What is claimed as new and desired to be protected by Letters Patent is set forth in the appended claims:

1. A penumatic arrangement for raising an article from a predetermined location comprising, in combination, bellows means contractable for reducing the volume of said bellows means and expelling air from the interior of said bellows means when contracted, said bellows means also being expandable to increase said volume for drawing air thereinto; a tubular member communicating with said bellows means and attached to said bellows means; valve means at one end of said tubular member for releasing air under pressure within said tubular member to the outside atmosphere, said valve means preventing air flow into said tubular member from the outside atmosphere when the pressure within sad tubular member is below the pressure of the outside atmosphere; movable support means supporting said tubular member and moving said tubular member with bellows means attached against said article for raising the same from its predetermined location, said support means moving said tubular member so that said bellows means is first contracted and subsequently expanded to produce a partial vacuum within said bellows means and thereby apply a suction force to said article; and adjusting means communicating with said bellows means for adjusting the suction force applied to said article to a predetermined magnitude, whereby air is admitted to said adjusting means into said bellows means for neutralizing the vacuum within said bellows means when said predetermined magnitude of the suction force is exceeded through the weight of the article being raised.

2. A pneumatic arrangement for raising an article as defined in claim 1 wherein said adjusting means comprises spring means with support secured to said tubular member; threaded means in contact with said spring means and adjusting the spring force through its threaded position; a displaceable member threaded for supporting said threaded means and dispaceably joined to said tubular member, whereby adjustment of said threaded means adjusts a spring force of said spring means and thereby said suction force.

3. A pneumatic arrangement for raising an article as defined in claim 2 wherein said displaceable member and said support for said spring means have openings through which air is admitted when said displaceable member is forced downward upon exceeding said suction force to the weight of said article.

4. A pneumatic arrangement for raising an article as defined in claim 3 including sealing ring means between said displaceable member and said tubular member for preventing passage of air between said members when said displaceable member remains in undisplaced position relative to said tubular member.

5. A pneumatic arrangement for raising an article as defined in claim 2 wherein said threaded means is a cap nut.

6. A pneumatic arrangement for raising an article as defined in claim 2 wherein said spring means comprises a compression spring.

7. A pneumatic arrangement for raising an article as defined in claim 1 wherein said movable support means is vertically displaceable.

8. A pneumatic arrangement for raising an article as defined in claim 1 wherein said valve means comprises diaphragm means secured to diaphragm ring means.

9. A pneumatic arrangement for raising an article as defined in claim 1 including means for gradually neutralizing the vacuum within said bellows means when releasing said article after raised from said predetermined location, whereby said article is gradually released through gradual decrease in said suction force.

10. A pneumatic arrangement for raising an article as defined in claim 2 wherein said displaceable member is a profile member.

11. A pneumatic arrangement for raising an article from a predetermined location comprising, in combination, bellows means contractable for reducing the interior volume of said bellows means and being expandable to increase said volume; a tubular member communicating with said bellows means and attached to said bellows means; outlet and inlet means at one end of said tubular member for the passage of air out of said tubular member and said bellows means to create a vacuum within said bellows means and thereby apply a suction force to said article, said outlet and inlet means also passing air into said tubular member and said bellows means for neutralizing a pre-existing vacuum; and adjusting means communicating with said bellows means for adjusting the suction force applied to said article to a predetermined magnitude, whereby air is admitted through said adjusting means into said bellows means for neutralizing the vacuum within said bellows means when said predetermined magnitude of the suction force is exceeded through the weight of the article being raised.

12. A pneumatic arrangement for raising an article as defined in claim 11 wherein said outlet-inlet means comprises connecting nipple means.

13. A pneumatic arrangement for raising an article as defined in claim 11 including vacuum generating means communicating with said outlet-inlet means for generating said vacuum within the interior of said bellows.

14. A pneumatic arrangement for raising an article as defined in claim 12 including sealing disc means sealing said one end of said tubular member and sealingly securing said nipple means to said tubular member.

15. A pneumatic arrangement for raising an article as defined in claim 12 including vacuum generating means communicating with said nipple means for generating said vacuum within the interior of said bellows.

References Cited

UNITED STATES PATENTS 2,681,757   6/1954   Kellersman _____ 214—1(BS)

FOREIGN PATENTS 1,176,816   7/1961   Germany _____ 294—64
972,612   10/1964   Great Britain _____ 294—64

RICHARD AEGERTER, Primary Examiner

D. D. WATTS, Assistant Examiner